Oct. 22, 1946.  J. OGDEN  2,409,888
TIMING DEVICE
Filed Sept. 21, 1940
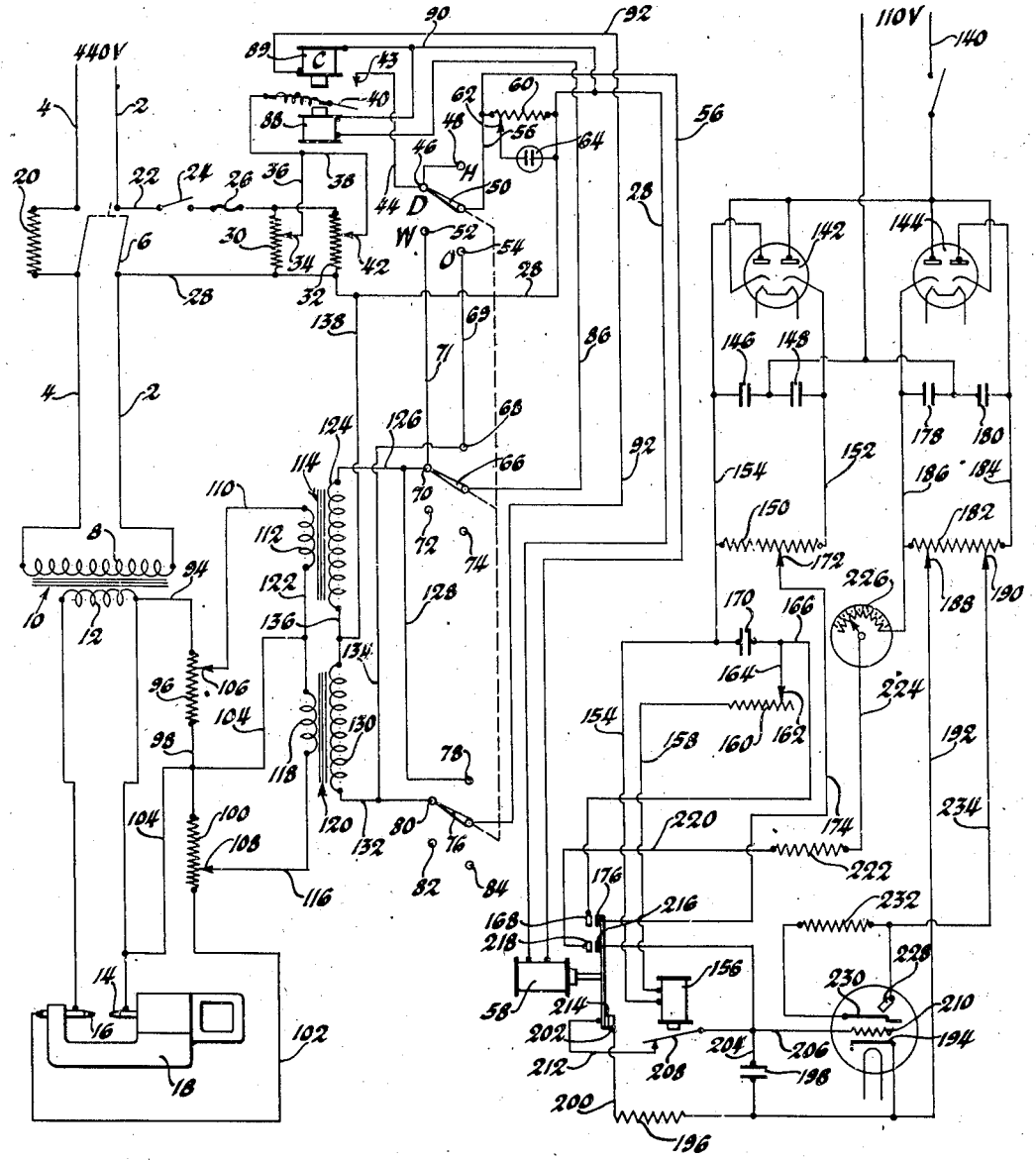
Inventor
Jack Ogden
By
Blackmore, Spencer & Flint
Attorneys Patented Oct. 22, 1946

2,409,888

UNITED STATES PATENT OFFICE 2,409,888

TIMING DEVICE

Jack Ogden, Huntington Woods, Mich., assignor to General Motors Corporation, Detroit, Mich., a corporation of Delaware Application September 21, 1940, Serial No. 357,794

11 Claims. (Cl. 219—4)

This invention relates to timing devices and more specifically to electrical circuits for measuring minute time intervals. The need for measuring devices which will measure very small increments of time has increased decidedly and at the present time devices of this nature are much in demand. While the uses for such a device throughout industry are varied, one might be mentioned as an example here in timing the various steps of welding machine cycles. The art of welding has moved rapidly and in order to provide the results desired, welding times must be measured very accurately and then the control adjusted to keep them within very narrow limits. While, of course, the most important time is the welding time, nevertheless the other time periods which go to complete the total welding cycle are also important and with the present speed of welding become very minute. Since many materials are welded and in quantity the welding machines receive considerable use and it is necessary therefore to check these periodically to make sure they stay within the certain predetermined time limits in order to provide the welds which they were designed to produce.

Therefore, the present invention shall be described as applied to a welding circuit, but it is to be understood that this is merely illustrative as to one of its uses and that it may be used equally as well to measure the time of any other means where minute times are important. In welding, therefore, there are four main portions to a complete welding cycle: first, the "off" time during which the circuit is inoperative; second, the "delay" time during which the material is placed between the electrodes, but before the operating current has been turned on; third, the "weld" time during which welding current is applied; and, fourth, the "hold" time during which the welding current is off but the material is still held between the electrodes for a short period to allow it to cool. These four steps comprise the complete welding cycle and of course are repeated as often as necessary to provide additional welds to the material. It has been found that the time periods for each of these portions of the machine cycle is very important and in order to obtain commercially satisfactory welds it is necessary to have each fall within the predetermined limits and of course it is well-known that these times now comprise cycles or perhaps even fractions of cycles of supply current fluctuation.

It is therefore an object of my invention to provide timing means capable of measuring very small time periods.

It is a further object of my invention to provide such a timing device that can be easily applied to an existing circuit and which will not interfere with the normal operation thereof.

It is a still further object of my invention to provide such a timing device as will be easily portable and maintain its adjustments.

With these and further objects in view which will be apparent upon the disclosure which is to follow, my invention will be best understood by reference to the following specification and claims and the illustration in the acompanying drawing, in which:

The figure shows a schematic wiring diagram of the time measuring system of my invention.

There is shown in the upper left-hand portion of the figure an incoming line 2, 4 which is labeled in the present instance "440 volts" which is that usually supplied to supply lines for welders, but which may of course be any other voltage required. In this line is a single or double-pole, single-throw switch 6 which connects the line to the primary 8 of the welding transformer 10 across whose secondary 12 are applied the two electrodes 14 and 16 for welding. These are held in any conventional support 18 and may be moved relative to each other for clamping the work therebetween. Connected across one side of the switch 6 is a resistor 20, the purpose of which will later be described. Connected to the stationary terminal of the opposite side of the switch 6 is a line 22 in which is provided in series a switch 24 and a fuse 26. There are then connected between this line 22 and a line 28 connected to the movable switch leg of the switch 6 two resistances 30 and 32 in parallel. A movable switch point 34 which may be moved over the resistance 30 is connected by a line 36 to a line 38 which is connected to one side of a snap-over switch 40. The line 38 is also connected to a movable point 42 which slides upon the resistor 32 to cut in or out varying portions thereof.

The movable member 40 cooperates with a stationary point 43 which is connected by line 44 to two spaced stationary switch points 46 and 48 which cooperate with a rotating switch arm 50. Also cooperating with the same switch arm 50 are two other stationary switch members 52 and 54, all four of said stationary points lying in a circle around the axis about which the switch arm 50 rotates. Connected to the switch arm 50 is a line 56 which is connected to a relay coil 58, the opposite side of which is connected directly to the line 28 which as before mentioned is connected to incoming line 2 below the switch 6. Connected between lines 56 and 28 is a resistor 60 and tapped to this resistor and variable over the surface thereof is a switch point 62 which is connected to a small neon lamp 64, the opposite side of which is connected to the line 28.

Cooperating with the switch arm 50 and mechanically connected thereto to move in synchronism therewith is a second switch arm 66 which rotates about and engages a series of stationary switch points 68, 70, 72 and 74, switch point 68 being connected to stationary switch point 54 by line 69 and switch point 70 being connected to switch point 52 by line 71. There is also a third rotating switch arm 76 which engages stationary switch points 78, 80, 82 and 84 substantially in circular position thereabout. These three rotating switch arms 50, 66 and 76 are mechanically connected together so that when one is moved they all assume the same relative position. This is shown by the dotted line connections.

The rotating switch arm 66 is connected by line 86 to one side 88 of a compound relay, the center tap of which is connected by line 90 to line 28 and the opposite side 89 of which is connected by line 92 to the rotating arm 76. These two relay coils 88 and 89 actuate the snap switch member 40 which maintains the position into which it was last moved so that it is necessary to energize coil 88 to open switch 40 and coil 89 to close the same.

Connected to one side of the transformer secondary 12 is a line 94 which is connected to a resistance 96, the opposite side of the resistance being connected by line 98 to a second resistance 100 which is in turn connected by line 102 to one of the welding electrodes 16. The opposite welding electrode, namely 14, is connected by line 104 to the common line 98. Both resistors 96 and 100 are variable and have adjustable taps 106 and 108 respectively which may be moved to vary the amount of current flowing in their respective circuits. Tap 106 is connected by line 110 to the primary 112 of a transformer 114 and 108 is connected by line 116 to one side of the primary 118 of a second transformer 120, the opposite sides of both primary 112 and 118 being connected together by a line 122 which is also connected to line 104.

One terminal of the secondary 124 is connected by line 126 to stationary contact 70 engageable with the rotating switch member 66. Tapped from this line is a further line 128 which is connected to the stationary contact 78 engageable by the rotating switch arm 76. One side of the secondary 130 of the transformer 120 is connected by line 132 to stationary contact 80 engageable by rotating switch member 76 and a tap line 134 connects line 132 with the stationary contact 68 engageable by the rotatable switch member 66. As in the primary circuits, the two secondaries 124 and 130 are connected together by line 136 and are connected to line 28 by line 138.

It is, of course, obvious that switch 40 is operated by relay coils 88 and 89 and that the remainder of the switches in the circuit described so far are all manually operated switches.

There is also provided a lower voltage supply line 140 of a voltage, for example 110 volts, to supply power for the indicating apparatus, the apparatus described up to this point being what might be called control apparatus. This incoming 110 volt line is connected to two rectifier tubes 142, 144 which supply the necessary direct current from the usual alternating current supply.

The tube 142 supplies direct current across a pair of condensers 146 and 148 and a resistor 150 through lines 152 and 154. Line 154 continues and is connected to a relay coil 156, the opposite side of which is connected by line 158 to a variable resistor 160, the adjustable tap 162 of which is connected by line 164 to line 166, this line being connected to a stationary switch point 168. Between lines 154 and lines 166 there is provided a fixed condenser 170. The adjustable tap 172 on resistor 150 is connected by line 174 to a movable switch point 176 actuated by relay coil 58 and cooperating with the stationary switch point 168 just described. Thus the tube 142 supplies power to charge the condenser 170 and energize the relay coil 156.

The tube 144 on the other hand supplies power across a pair of condensers 178 and 180 which are in parallel across a variable resistor 182 through lines 184 and 186. The resistor 182 has two adjustable taps 188 and 190, the first of these being connected through line 192 to a cathode 194 of a "magic eye" or 6E5 tube of the cathode ray type. Line 192 is also connected to one side of a resistor 196 and one side of a condenser 198, the opposite side of the resistor being connected by line 200 to a stationary contact 202. The opposite side of the condenser is connected through line 204 to line 206, the latter being connected to a movable switch element 208 and to the grid or control element 210 of the 6E5 tube. The stationary switch member cooperating with the movable switch element 208 is connected by line 212 to a movable switch member 214 actuated by the relay coil 58. Line 204 continues and is connected to a movable switch point 216 also actuated by the relay coil 58. These three movable contacts 176, 218, and 214 are all supported on a common bracket and are moved simultaneously by the actuation of the relay coil 58. It should also be noted that switches 168—176 and 216—218 are closed upon energization of the relay coil 58 while switch 202—214 is opened upon such energization. Any suitable spring bias means (not shown) may be provided to return the movable switch arm upon deenergization of the coil 58 to its deenergized position to open switches 168—176 and 216—218 and close switch 202—214. The movable contact 216 cooperates with a stationary contact 218 which is connected by line 220 with a resistor 222, the opposite side of which is connected by line 224 to a variable resistance 226 which is connected to the line 186. The remaining elements 228 and 230 of the 6E5 tube are connected across a resistor 232 and thence by common line 234 to the adjustable tap 190 on resistor 182.

From the foregoing it will be evident that there is provided a circuit for the welding machine proper, a control circuit tapped from the weld supply circuit which is settable in a series of positions, and a third circuit supplied by power at a lower potential for operating the indicating means which in this instance is a cathode ray tube which has a portion thereon the shade of which may be changed by a control electrode in the nature of a shadow to set or indicate the time interval. When the welding control switch 6 is closed power is supplied to the transformer 10 and when the welding electrodes 16 and 14 are placed in juxtaposition to the material current is allowed to flow therethrough to perform a weld. The three switch arms 50, 66 and 76 as before mentioned all move in unison and are placed upon the corresponding stationary switch points for measuring different time intervals. For example, when they are all in their upright position or in contact with switch points 48, 68 and 78, respectively, the circuit is in condition to measure the hold time. When they are moved down to the next counterclockwise position and contact switch points 46, 70 and 80, respectively, they are in condition to measure the delay time. When they are moved one further notch downward the circuit is in condition to measure the weld time and when they are in their lowermost position they measure the off time.

Let us assume first that it is desired to measure the off time or that time during which no material is between the electrodes, the same having been moved apart and the switch 6 is open. The current on the incoming line 2—4 will of course be available and it is assumed in this instance that the switch 24 is closed. Some current will of course flow through the primary 8 of the welding transformer 10 through the resistances 20 and 30 and this will of course develop some potential across the secondary 12 which will be available across lines 104 and 102. Thus there will be an energizing circuit for relay 58 provided as follows: secondary 12, line 104, line 122, primary 118, line 116, contact 108, resistor 100, line 102, to electrode 16 to the opposite side of the secondary 12. This will cause energization of the transformer secondary 130 which will provide an energization for the relay coil 58 as follows: secondary 130, line 132, line 134, line 60, contact point 54, switch arm 50, line 56, relay coil 58, line 28, line 138 back to secondary 130.

As will be evident from the diagram, when relay 58 is energized and attracts its armature, contacts 168, 176 and 218, 216 close and contacts 202, 214 open. The closure of contacts 168—176 causes the energization of relay coil 156 through the following circuit: From the output of tube 142, line 154, relay coil 156, line 158, resistor 160, line 164, line 166, contacts 168—176, line 174, adjustable point 172, resistance 150 to line 152. At the same time this applies the output voltage of tube 142 to the condenser 170. When relay coil 156 is thus energized it attracts its armature and opens the switch 208. With the opening of this switch and switch 202, 214, the short circuit applied to the condenser 198 is entirely removed and closure of switch 216, 218 applies to this condenser through a circuit to be described the output of tube 144. This is applied through the following circuit: line 186, variable resistor 226, line 224, resistor 222, line 220, switch 216, 218 to condenser 198. The amount of energy applied to the condenser 198 is regulated by the setting of the resistor 226, the dial of which is calibrated in cycles. This voltage is applied to the control element or grid 210 of the 6E5 tube and causes the shadow portion to become smaller and if resistor 226 is properly set will disappear entirely, the setting of this dial indicating the length of time of the operation. The necessary operating voltages for the remaining elements of the tube are provided by lines 192 and 234 through resistance 182 by obvious circuits.

As the particular period, in this case off time, is finished, the voltage between the two points first mentioned in the secondary circuit of the welding transformer will decrease due to the placing of work between the electrodes causing relay 58 to be deenergized to open switch 168, 176 and switch 216, 218 and closing switch 202, 214. The opening of switch 216, 218 will remove the supply of energy from the condenser 198 and the opening of switch 168, 176 will open the circuit to the relay coil 156. However, this will not immediately drop its contact 208 inasmuch as the condenser 170 is still directly across the relay terminals. This charge will slowly leak off and in a short time the switch 208 will drop, completing the short-circuit around the condenser 198 and discharging the same, returning the apparatus to its initial condition. This delay is provided to allow a time to elapse between the charge and discharge of the condenser 198 so that the retina of the eye of the operator or observer may follow fluctuations on the shadow in the cathode ray tube. It will thus be evident that as the variable resistor 226 is altered so that the shadow will disappear the reading on this dial in seconds will give the duration of the portion of the cycle being measured.

While in this instance switch 40 was not utilized in the energizing circuit for the relay 58, it does play an important part in some of the other portions of the cycle to be measured, namely, in the delay and hold periods, and is utilized to open once each cycle to maintain the relay coil 58 deenergized during the period not intended to be measured. Both the hold and delay times are measured by voltage developed across resistances 30 and 32 and therefore if it is desired to measure hold time then it will be necessary to deenergize the control circuit through the delay time portion of the cycle or otherwise the two would be superposed and could not be differentiated. It is therefore so designed that this switch is set in its closed position in the portion of the cycle immediately preceding that being measured for the hold or delay measurements. In other words, if we are measuring delay time then the coil 89 is energized in the off portion of the cycle to properly position the switch contact 40 so that when the portion of the cycle being measured arrives it will be in its proper position.

With this explanation let us now proceed to trace the circuits utilized when measuring delay time and we move our gang switch 50, 66, 76 to a position in which the arms are slanting upwardly to the left and are on stationary contacts 46, 70 and 80. It is to be remembered that during the measurements of any of these portions the total cycle is being repeated at all times and we only isolate a portion thereof for measurement with the gang switch in the position just mentioned. The relay 58 will now be energized by the voltage drop across resistances 30 and 32 and in order to avail ourselves of this voltage it will be necessary to close switch 40. This is done by energizing the closing coil or coil 89 of the relay which operates this switch. This is energized through the following circuit: the voltage across the secondary of the welding transformer 10 again as in the previously described case energizes the transformer 120 so that its secondary has current flowing therein and supplies the energizing force for the relay coil 89 through the following circuit: secondary 130, line 132, contact 80, switch arm 76, line 92, coil 89, return line 90, line 28, line 138 back to secondary 130. It should be remembered that this occurs in the time period immediately preceding the delay time or in the off time period during which there is no work between the electrodes and therefore the voltage of the secondary will be applied as before to the transformer 120. This closes the switch 40 so that it is fully closed when we arrive at the delay portion of said cycle.

The relay coil 58 is then energized through the following circuit, it being understood of course that voltage is developed across the resistors 30 and 32 and is conducted therefrom to line 38, switch 40, contact 43, line 44, switch point 46, arm 50, line 56, relay coil 58, line 28, back to resistors 30 and 32. This again causes exactly the same result in energizing the relay coil 156 and applying voltage to the condenser 198 to reduce the shadow area of the cathode ray tube and again, by setting the variable resistance 226 so that the shadow entirely disappears, we may read the correct time for this portion of the cycle. In the next portion of the cycle immediately following or the weld portion, it is necessary to cause switch 40 to open so that as previously mentioned the hold time will not also be measured. When the weld is being made there is a substantially heavy current flowing in the secondary of the welding circuit, very little potential drop across the weld electrodes and therefore only a slight current for the transformer 120, but there will be a substantial potential drop through the lead from the secondary 12 to the electrode 14 and the primary of transformer 114 will be energized through the following circuit: line 94, resistor 96, tap 106, line 110, primary 112, line 122, line 104 to the lead adjacent the electrode 14. This drop in the lead will be applied to the primary and energize the secondary which will cause actuation of the opening coil 88 of the switch 40 through the following circuit: secondary 124, line 126, contact 70, arm 66, line 36, coil 88, line 90, line 28, line 138, line 136 back to the secondary 124. This of course will cause the switch 40 to open during the weld time and therefore as the cycle proceeds to the hold time this will not now be measured. However, as the cycle proceeds to off time the coil 89 will be again energized and the system put in condition for relay 58 to operate during the delay portion which it has been assumed was being measured.

If we now desire to ascertain the weld time, we move our gang switch to the third position in which the movable switch arms extend downwardly and to the left as in the figure and contact stationary points 52, 72 and 82. In this position as before it is first necessary to set switch 40 in the proper position and in this particular instance it is desired to have this switch open and it is so set and does not operate at all during this measuring operation. This will be evident from an inspection of the drawing as there is no circuit available through either coil 88 or 89. The power obtained in this particular test for operating the relay 58 is provided from the transformer secondary 124, the secondary being energized by the same circuits as before mentioned which are connected to the welding transformer secondary 12 through the voltage drop in the lead between the secondary 12 and the electrode 14. The circuit to the relay coil 58 is now traceable as follows: secondary 124, line 126, contact 70, line 71, contact 52, switch arm 50, line 56, relay coil 58, line 28, line 138, back to secondary 124. This again causes the indicating means to proceed through its previously described cycle.

It will be obvious that the same general procedure is followed for ascertaining the holding time, the gang switch in this instance being placed in its uppermost position contacting stationary points 48, 68 and 78 and in this instance again relay 58 is energized due to the closure of switch 40 by the closing relay coil 89 which is energized through the following circuit from the secondary of transformer 112; secondary 124, line 136, line 138, line 28, line 90, relay coil 89, line 92, rotating switch point 76, contact 78, line 128, and back to the secondary 124. This causes the closure of switch 40 in the time interval just preceding the hold time so that during the time for holding relay coil 58 will be energized through the following circuit: beginning again at the voltage developed across resistors 30 and 32, line 38, switch 40, contact 43, line 44, contact 48, switch arm 50, line 56, relay 58, line 28, and back to the resistors. Again we have the actuation of the indicating means as before described. It is necessary in this instance as in measuring the delay time previously described to cause switch 40 to open during the off portion so that the delay time also will not be indicated.

It is thus obvious that by merely clamping to the existing welding circuit the necessary connections which in this instance are only five wires, namely, 22 and 28 connected adjacent the manual or automatically thrown weld switch, and lines 94, 104 and 102 connected in the secondary circuit, we are able to ascertain the accurate times of the different portions of the welding cycle. It is only necessary to supplement this by connecting across the opposite side of the switch such as 6 a resistor 20 to provide a continuous circuit to the welding transformer when the switch 6 is open as it will be obvious that some current is necessary for the operation of the device at these other times. The various resistances provided are as it will be seen mostly adjustable but these are merely for the purpose of initial setting to provide the proper current to any of the transformers or other portions of the apparatus, depending upon the variations in the voltage of the circuit to which the test equipment is attached. For example, tap 172 on resistor 150 is varied until the proper voltage is applied to the relay 156 and to the condenser 170 thereacross. This also applies to the variations in the taps 188 and 190 of the resistor 182 which supplies power to the 6E5 or cathode ray tube for indicating purposes. The resistances 30 and 32 also have taps so that the voltage applied by them for operating the relay coil 58 may be varied to fall within the proper range. This range may be found by utilizing the neon tube 64 which is supplied across the circuit to the relay coil 58 and the amount of resistance is increased until the neon voltage indicator flashes to indicate that sufficient power is being applied for actuation of the relay coil when the necessity occurs. It will thus be evident that I have provided a test device which is portable, easily applied to existing apparatus, easily operated and will continue to operate over a substantial length of time with little repair.

I claim:

1. In a system for measuring the times of the various portions of a complete welding cycle, a welding machine, a transformer having a primary and secondary connected thereto, a source of power for the primary and switching means to control the primary, a pair of lines connected across the switching means, resistances connected across each line, two lines connected directly across the welding electrodes and one line connected to one side of the transformer secondary, a pair of transformers connected across the last three lines, a compound switch connected to the output of the pair of transformers and to the resistors, relay means connected to and supplied with power from either the transformer pair or the resistances and controlled by the switching means, and indicating means controlled by the relay means whereby as the compound switching means is moved to different positions different time periods will be measured as evidenced by different voltages appearing between the various incoming lines and indicated on said indicating means.

2. In a system for measuring the times of the various portions of a complete welding cycle, a welding machine, a transformer having a primary and secondary connected thereto, a source of power for the primary and switching means to control the primary, a pair of lines connected across the switching means, resistances connected across each line, two lines connected directly across the welding electrodes and one line connected to one side of the transformer secondary, a pair of transformers connected across the last three lines, a compound switch connected to the output of the pair of transformers and to the resistors, relay means connected to and supplied with power from either the transformer pair or the resistances and controlled by the switching means, indicating means controlled by the relay means whereby as the compound switching means is moved to different positions different time periods will be measured as evidenced by different voltages appearing between the various incoming lines, and indicated on said indicating means, said indicating means comprising, a visual indicator, a separate source of power, means connected between the visual means and the source for varying the power to the indicator and switching means actuated by said relay means, the setting of the variable means for indicator input being an index of the time being measured.

3. In a system for measuring the time interval of a portion of a machine operation while said machine is operating normally, a welding machine, a transformer connected thereto to provide power, a source of power connected to the transformer and a switch in the supply to control welding operations, a plurality of lines connected in the secondary circuit of the transformer across different points where voltages will appear during different parts of the welding cycle, relays operated by these different voltages, switching means between the lines and the relays to connect the relays to different lines whereby they will be energized during different portions of the full cycle and indicating means controlled by said relays.

4. In a system for measuring the time interval of portions of a machine operation while said machine is operating normally, a machine, a transformer connected thereto to supply power, a source of power connected to the transformer, a plurality of lines connected to the secondary circuit of the transformer across different points to which voltage is supplied the machine where voltages are developed during different parts of the machine cycle, relay coils connected to and operated by these voltages through the lines, switching means for connecting the relays to the different lines, additional lines connected to the primary transformer circuit, resistances connected thereacross to develop voltage, means to connect the resistance means to the relays to operate the same, switching means in this last named circuit operated by one of said relays and indicating means operated by another of said relays.

5. In a system for measuring various time intervals in a complete machine cycle, some of the periods being duplicates as far as machine conditions are concerned but appearing at different times in the complete cycle, indicating means, switching means for controlling the energization of said indicating means, control means connected to the machine for actuating the switching means and a second control means superimposed upon the first and energized at desired intervals to cause deenergization of the main control means during duplicate condition periods when measuring the time of one of these.

6. In a system for measuring the various time periods of a welding cycle in which the machine is in the same condition during both the delay and hold portions of the cycle, a transformer, the secondary of which is connected to the welding electrodes, a voltage supply connected to the primary, indicating means, control means therefor, a circuit controlling the energization of the control means connected to the secondary and the welding electrodes and energized both by the voltage across the electrodes when they are open or by the voltage drop through the lead to determine the energization of the main control means so that only the delay or the hold time is measured at a given setting.

7. In a timing device for measuring the various portions of a complete machine cycle, a plurality of conductive lines connected to the device to be tested at various positions whereby voltage differences will be developed between different conductors at different times during the complete machine cycle, switching means connected to the conductive lines, relay means connected to the switching means whereby the relay may be connected to different pairs of conductors and have the periodic voltage appearing between them energize the relay, a condenser, indicating means to show the charge on said condenser, a separate source of power, variable resistance means connected between the condenser and the source to vary the rate of charge of the condenser and a switch operated by the relay connected in series with the resistance and the condenser to vary the time the charging current is applied whereby both the rate and time of charging the condenser may be varied and the integrated charge indicated.

8. In a timing device for measuring the various portions of a complete machine cycle, a plurality of conductive lines connected to the device to be tested at various positions whereby voltage differences will be developed between different conductors at different times during the complete machine cycle, switching means connected to the conductive lines, relay means connected to the switching means whereby the relay may be connected to different pairs of conductors and have the periodic voltage appearing between them energize the relay, a condenser, indicating means to show the charge on said condenser, a separate source of power, variable resistance means connected between the condenser and the source to vary the rate of charge of the condenser and a switch operated by the relay connected in series with the resistance and the condenser to vary the time the charging current is applied whereby both the rate and time of charging the condenser may be varied and the integrated charge indicated, and automatic means to delay discharge of the condenser.

9. In a timing device for selectively measuring the duration of different portions of the operating cycle of a repetitively operating electrical machine connected to a power circuit, a plurality of conductive lines connected to the machine and the power circuit at a plurality of points so that voltages will be developed between different lines at different instants in operation, said voltages for two different portions of the operating cycle being developed across the same lines, but the voltages for the next preceding portions in each being developed across different lines, compound switching means connected to said lines, relay means connected to the switching means and controlled thereby and a second relay means also controlled by the switching means actuated in the next preceding portion of the operating cycle to that being measured to provide selection of the desired interval and not the other interval defined by the same voltage derivation.

10. In a timing device for selectively measuring the duration of different portions of the operating cycle of a repetitively operating electrical machine connected to a power circuit, a plurality of conductive lines connected to the machine and the power circuit at a plurality of points so that voltages will be developed between different lines at different instants in operation, said voltages for two different portions of the operating cycle being developed across the same lines, but the voltages for the next preceding portions in each being developed across different lines, switching means having a plurality of movable arms and each a plurality of contacts connected to said lines, relay means connected to a portion of the switching means and controlled thereby, a second relay means connected to a separate portion of the switching means and controlled thereby, and further switching means controlled by the second relay means and interposed between the first relay means and the first-named switching means to selectively control the operation of the first-named relay means to differentiate between intervals defined by like voltage differences.

11. In a timing device for selectively measuring the duration of different portions of the operating cycle of a repetitively operating electrical machine connected to a power circuit, a plurality of conductive lines connected to the machine and the power circuit at a plurality of points so that voltages will be developed between different lines at different instants in operation, said voltages for two different portions of the operating cycle being developed across the same lines, but the voltages for the next preceding portions in each being developed across different lines, switching means having a plurality of movable arms and each a plurality of contacts connected to said lines, relay means connected to a portion of the switching means and controlled thereby, a second relay means connected to a separate portion of the switching means and controlled thereby, and further switching means controlled by the second relay means and interposed between the first relay means and the first-named switching means, said second relay being operated in that portion of the cycle preceding the one being instantly measured to condition the first relay means to differentiate between intervals defined by like voltage.

JACK OGDEN.